(12) United States Patent
Sato

(10) Patent No.: US 6,181,830 B1
(45) Date of Patent: Jan. 30, 2001

(54) IMAGE SIGNAL CORRECTION DEVICE

(75) Inventor: Koichi Sato, Saitama (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/052,063

(22) Filed: Mar. 31, 1998

(30) Foreign Application Priority Data

Apr. 9, 1997 (JP) ............................................. P09-106706

(51) Int. Cl.⁷ .............................. G06T 5/00; H04N 5/235
(52) U.S. Cl. ......................... 382/274; 382/275; 348/246; 348/251
(58) Field of Search .................................. 382/274, 275, 382/254, 260; 358/461, 463, 455; 348/241, 243, 246, 247, 251

(56) References Cited

U.S. PATENT DOCUMENTS

| | | | |
|---|---|---|---|
| 4,354,243 | * 10/1982 | Ryan et al. ............................. | 382/254 |
| 4,524,388 | * 6/1985 | Abe et al. .............................. | 358/461 |
| 4,600,946 | * 7/1986 | Levine ................................... | 348/246 |
| 5,272,536 | * 12/1993 | Sudo et al. ............................ | 348/243 |
| 5,398,119 | * 3/1995 | Suzuki et al. ......................... | 358/461 |

FOREIGN PATENT DOCUMENTS 8-251484    9/1996  (JP) .

* cited by examiner

*Primary Examiner*—Scott Rogers
(74) *Attorney, Agent, or Firm*—Greenblum & Bernstein, P.L.C.

(57) ABSTRACT

An image signal correction device comprises a shading correction circuit, a shading correction data memory and a defective pixel detecting circuit. A shading correction data corresponding to each of the pixels forming an image signal, outputted from a CCD, is stored in the shading correction data memory. In the shading correction circuit, the image signal is subjected to a shading correction in accordance with the shading correction data read from the shading correction data memory. The shading correction data is a 256-gradation data, for example. In a memory area corresponding to the highest gradation level in the shading correction data memory, the shading correction data is replaced with a defective pixel data, showing that the corresponding pixel is a defective pixel. When a defective pixel is detected by the defective pixel detecting circuit, a delay circuit is actuated, so that a pixel data, having no defect, is outputted from the delay circuit in place of the defective pixel data.

6 Claims, 4 Drawing Sheets

IMAGE SIGNAL CORRECTION DEVICE

BACKGROUND OF THE INVENTION

1. Field of the Invention

The present invention relates to an image signal correction device by which an image signal, obtained by an imaging device, is subjected to a shading correction and a defect correction.

2. Description of the Related Art

Conventionally, in an electronic still camera, each pixel data, corresponding to a part of an image formed on an imaging device, such as a solid-state imaging device, needs to be subjected to a shading correction and a defect correction. The shading correction is carried out for correcting a shade (or a darkness) generated around the periphery of the image, due to the inherent characteristics of an optical element, such as a lens. The defect correction is performed in order to eliminate an effect of a defective pixel (i.e. a defective photo-diode), existing in the imaging device. Thus, the correction device provided in the electronic still camera is provided with a first memory, in which a defect pixel data, such as an address and a flag, indicating a defect pixel position, is stored for each pixel, and a second memory, in which a shading correction data, indicating a correction ratio of the shading, is stored for each pixel.

As described above, in the conventional correction device, since the defect pixel data and the shading correction data are stored in separate memories, each of the memories requires a relatively large capacity.

SUMMARY OF THE INVENTION

Therefore, an object of the invention is to provide an image signal correction device by which a capacity of a memory, necessary for storing the defect pixel data and the shading correction data, can be reduced.

According to the present invention, there is provided an image signal correction device comprising a memory in which a shading correction data, corresponding to a pixel data forming a part of an image obtained by an imaging device, is stored, and a correction processor for performing a predetermined defect correction. The correction processor performes the shading correction data from the memory to perform the shading correction to the pixel data when the shading correction data has a predetermined value. The correction processor applies the predetermined defect correction to the pixel data when the shading correction data has a value other than the predetermined value.

Further, according to the present invention, there is provided an image signal correction device, in which a data, included in shading correction data composed of data of a plurality of gradations, is used as a defect pixel data implying that a data of a pixel, which corresponds to the defect pixel data, has a defect.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
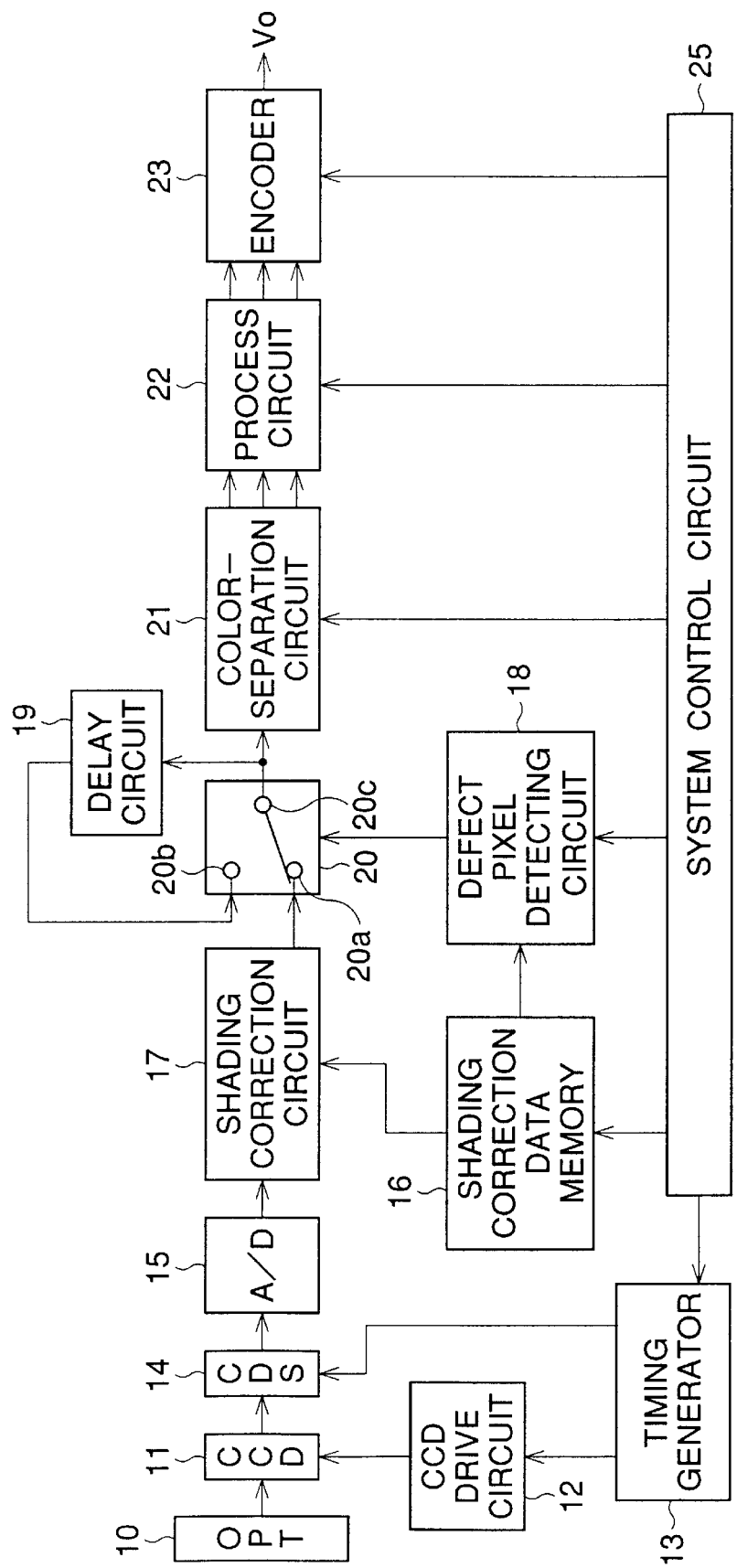
FIG. 1 is a block diagram of an image signal correction device of a first embodiment of the present invention.

The present invention will be described below with reference to embodiments shown in the drawings.

FIG. 1 shows a block diagram of an image signal correction device of a first embodiment of the present invention. The image signal correction device is provided in an electronic still camera.

The image signal correction device is controlled by a system control circuit 25, provided with a microcomputer. An imaging device (charge-coupled device (CCD)) 11, which is a solid-state imaging device, is disposed on an optical axis of a photographing optical system 10, so that an image obtained through the optical system 10 is formed on a light receiving surface of the CCD 11. One of a red, a green or a blue color filter is placed on each of the photo-diodes of the CCD, so that an image signal corresponding to a color image is obtained by the CCD 11.

The CCD 11 is controlled by a CCD drive circuit 12 to output an image signal corresponding to the image. A reset noise is removed from the output signal of the CCD 11, due to the operations performed by a correlated double sampling (CDS) circuit 14 and a timing generator 13, which outputs a sampling pulse. The image signal outputted from the CDS 14 is converted from an analog signal to a digital signal by an A/D converter 15.

The digital image signal is subjected to a shading correction or a defect correction. The shading correction is carried out, with respect to each pixel signal, in a shading correction circuit 17, in accordance with a corresponding shading correction data stored in a shading correction data memory 16. The defect correction is executed, with respect to a pixel signal, via operations of a defect pixel detecting circuit 18, a delay circuit 19 and a switching element 20, such as a CMOS analog switch, in accordance with a corresponding defective pixel data stored in the shading correction data memory 16.

Shading correction data and defective pixel data are stored in the shading correction data memory 16. The shading correction data are changed in accordance with the specific photographing optical system 10. A shading correction data indicates a ratio, based on the shading of a pixel data, corresponding to the center of a standard uniform-gray chart image, by which the shading of a pixel on the periphery of the image is raised to a standard value.

In the defective pixel detecting circuit 18, a switching signal is outputted to the switching element 20, in accordance with a data read from the shading correction data memory 16. Namely, when a shading correction data, corresponding to a pixel signal, is read from the shading correction data memory 16, the switching element 20 is switched to a first input terminal 20a, connected to an output terminal of the shading correction circuit 17, and when a defective pixel data, corresponding to a pixel signal, is read from the shading correction data memory 16, the switching element 20 is switched to a second input terminal 20b, connected to an output terminal of the delay circuit 19.

An output terminal 20c of the switching element 20 is connected to an input terminal of the delay circuit 19 and an input terminal of the color-separation circuit 21. When the switching element 20 is switched to the first input terminal 20a, which is connected to the shading correction circuit 17, the pixel signal, having been subjected to a shading correction, based on the respective shading correction data, in the shading correction circuit 17, is outputted from the switching element 20, having undergone no further processing, and is inputted to and temporarily stored in the delay circuit 19. When the switching element 20 is switched to the second input terminal 20b, which is connected to the delay circuit 19, in response to a read defective pixel data, the output signal, corresponding to a pixel signal having a defect, of the shading correction circuit 17 is prevented from passing through the switching element 20, and thus the previously temporarily-stored, shading corrected pixel signal is outputted by the delay circuit 19 to the switching element 20, which in turn outputs the pixel signal as a defect-corrected pixel signal, in place of the defective pixel signal.

Thus, from the output terminal 20c of the switching element 20, an image signal, which has been subjected to the shading correction or the defect correction, is outputted. The corrected image signal is divided into a red, a green and a blue image signal by a color-separation circuit 21. The red, the green and the blue image signals are subjected to a predetermined process, such as a gamma correction, in a process circuit 22, and are then converted into a video signal V0, which conforms to a predetermined video format, by an encoder 23. The video signal V0 is outputted to an external device not shown.

Figure 2:
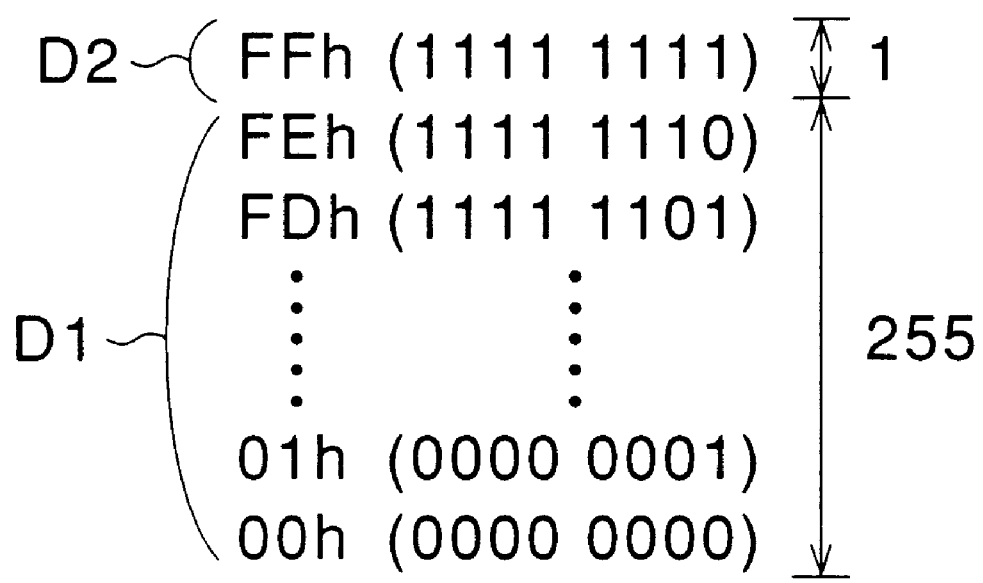
FIG. 2 is a view showing an example of the shading correction data and the defect pixel data.

FIG. 2 shows the shading correction data and the defect correction data.

In this embodiment, one of the 8 bit data indicating the shading correction data is used as a data for indicating information regarding the defect correction. Usually, the shading correction data indicates a gradation value, having a range of 256 levels. In this embodiment, data D1, representing 255 grdation levels, are used as the shading correction data, and a data D2, being the least significant gradation level when performing effective shading correction, is used as a data for representing a defective pixel. Namely, the data of the least significant level is detected in the defective pixel detecting circuit 18, indicating that the signal from the corresponding pixel exhibits a defect.

As described above, in the embodiment, since a part of the shading correction data is used for representing the defective pixel data, it is unnecessary to provide a separate memory for storing a defective pixel data corresponding to every pixel. Therefore, according to the embodiment, in comparison with a conventional device, in which a first memory for storing a defective pixel data and a second memory for storing a shading correction data are provided, a capacity of a memory, necessary for correcting an image signal, can be reduced.

Figure 3:
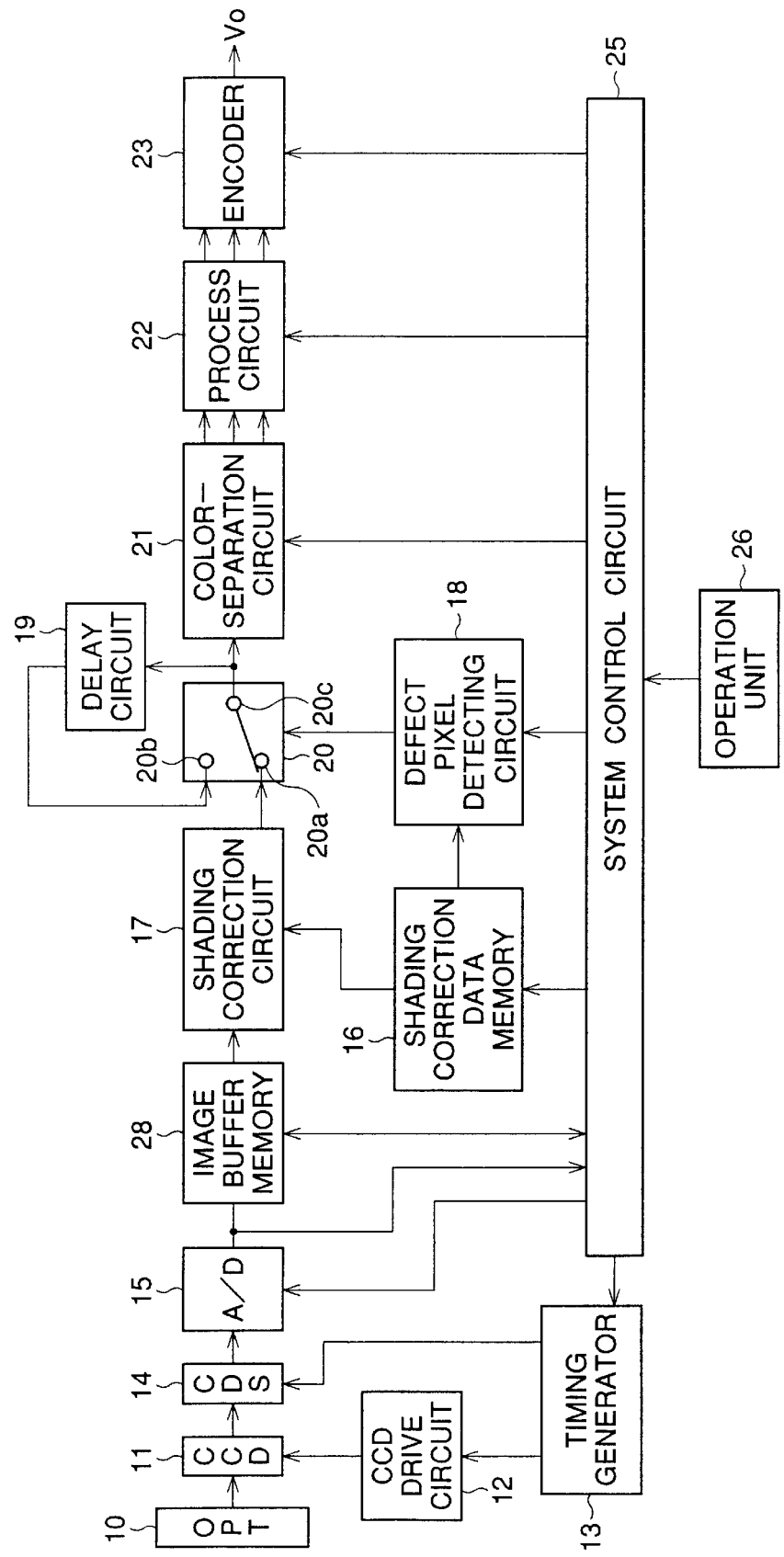
FIG. 3 is a block diagram of an image signal correction device of a second embodiment of the present invention.

FIG. 3 shows a block diagram of an image signal correction device of a second embodiment, by which the shading correction data and the defect correction data can be calculated. This device is effective when the photographing optical system 10 is an interchangeable lens. The second embodiment is basically the same as the first embodiment, except that an image buffer memory 28 is provided between the A/D convertor 15 and the shading correction circuit 17, and an operation unit 26 is connected to the system control circuit 25.

An image signal outputted from the A/D convertor 15 is inputted to the system control circuit 25, and consecutively recorded in the image buffer memory 28. In the system control circuit 25, a correction data, corresponding to each pixel, is calculated according to a signal outputted by the operation unit 26, and is recorded in the shading correction data memory 16. The image signal recorded in the image buffer memory 28 is used as a basis for generating a data indicating a shading amount, when the correction data is calculated, as described hereinafter. The operation unit 26 is provided with a switch, which is operated so that the shading correction data and the defect correction data are stored in the shading correction data memory 16. The other operations are similar to those of the first embodiment.

Figure 4:
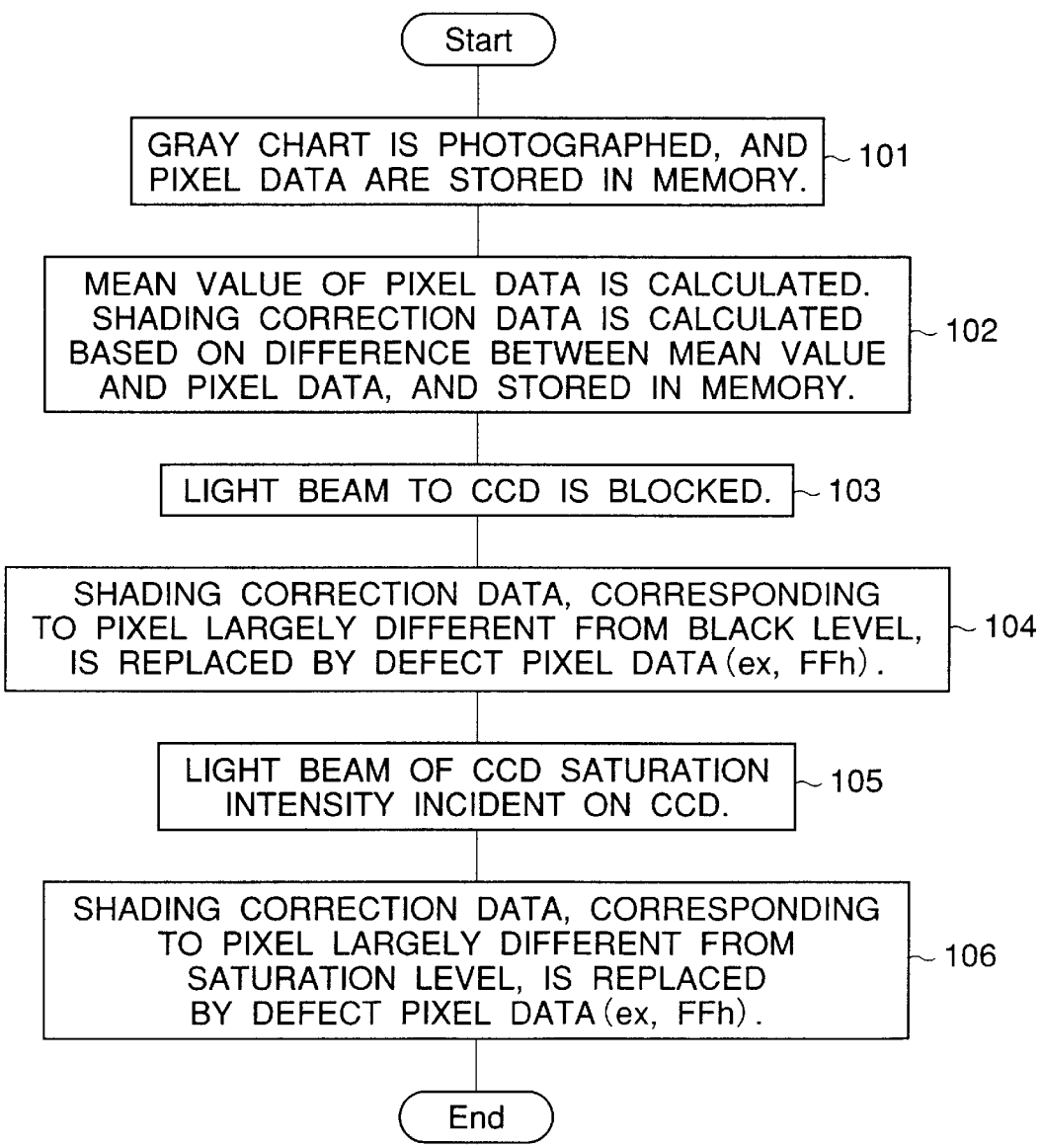
FIG. 4 is a flow chart of a correction data calculation process in the second embodiment.

FIG. 4 is a flow chart of a correction data calculation process in the second embodiment.

In Step 101, a standard uniform-gray chart, an image of which is used as the standard in the shading correction, is photographed. Namely, an image of the standard uniform-gray chart, i.e. a standard image, is formed on the CCD 11. An image signal corresponding to the standard image is outputted from the CCD 11, and the pixel data of the standard image are then stored in the image buffer memory 28. In Step 102, a mean value of the pixel data of the standard image is calculated, and a comparison between the mean value and each of the pixel data of the standard image is performed, so that the shading correction data, for each pixel of the CCD 11, is calculated based on the difference between the mean value and each of the pixel data, the difference being the shading amount. Then, in the shading correction data memory 16, the shading correction data, corresponding to each pixel of the CCD 11, is recorded in a respective address.

In Step 103, the photographing optical system 10 is covered with a cap, for example, so that a light beam is blocked from entering the CCD 11. As a result, all of the pixel data outputted from the CCD 11 should correspond to a uniformly black level. However, if a defective pixel (i.e. a defective photo-diode) exists in the CCD 11, the corresponding pixel data does not represent a black level. In Step 104, the shading correction data, corresponding to the pixel having a pixel data which is largely different from the black level, is replaced by a data ("$FF_h$" in the example of FIG. 2) implying that the pixel at this position has a defect.

In Step 105, a light beam, having an output saturation intensity with respect to the CCD 11, which is as high as one by which the output of the CCD 11 is saturated, is made incident on the photographing optical system 10. Namely, all of the pixel data outputted by the CCD 11 should represent a saturation level of the pixels of the CCD 11. However, if there is a defective pixel (i.e. a defective photo-diode) in the CCD 11, the corresponding pixel data does not represent the saturation level. In Step 106, the shading correction data, corresponding to the pixel having a pixel data which is largely different from the saturation level, is replaced by a data ("$FF_h$" in the example of FIG. 2) implying that the pixel at this position has a defect. Then, this program ends.

As described above, according to the second embodiment, since the shading correction data is replaced by the defect correction data, in accordance with the photographing optical system 10, even when the photographing optical system 10 is an interchangeable lens, an optimum correction process can always be applied to the image signal obtained by the CCD 11.

Although the embodiments of the present invention have been described herein with reference to the accompanying drawings, obviously many modifications and changes may be made by those skilled in this art without departing from the scope of the invention.

The present disclosure relates to subject matter contained in japanese patent application no. 9-106706 (filed on Apr. 9, 1997) which is expressly incorporated herein, by reference, in its entirety.

What is claimed is:

1. An image signal correction device comprising:

a memory in which a shading correction data corresponding to a pixel data forming a part of an image obtained by an imaging device is stored; and a correction processor for performing a shading correction and a predetermined defect correction, said correction processor reading said shading correction data from said memory to perform said shading correction to said pixel data when said shading correction data has a predetermined value, and said correction processor applying said predetermined defect correction to said pixel data when said shading correction data has a value other than said predetermined value.

2. An image signal correction device according to claim 1, wherein said predetermined defect correction includes a process in which a pixel data exhibiting a defect is replaced by a corrected pixel data.

3. An image signal correction device according to claim 1, wherein said shading correction data is a digital data represented by predetermined figures corresponding to a gradation, and a defective pixel data, implying that said pixel data has a defect, corresponds to a least significant value of said gradation of said digital data.

4. An image signal correction device according to claim 3, wherein said shading correction data is an 8 bit digital data, and said defective pixel data is the maximum value of said 8 bit digital data.

5. An image signal correction device according to claim 1, further comprising a correction data determination processor for determining said shading correction data for every pixel of said imaging device, said correction data determination processor detecting a defective pixel data, implying that said pixel data has a defect, when determining said shading correction data, and said correction data determination processor recording said shading correction data and said defective pixel data in said memory.

6. An image signal correction device comprising:

a memory structure for storing shading correction data for a plurality of pixel location, each shading correction datum being a variable value representing one of a plurality of gradations of shading correction at a corresponding pixel location; and a processor for interpreting said shading correction data, said processor recognizing at least one predetermined value of said variable values as representing a defective pixel at the corresponding pixel location instead of a shading correction at the corresponding pixel location, and said processor outputting a signal representative of the recognition.

* * * * *